US012793268B2

(12) United States Patent
Ulasen et al.

(10) Patent No.: US 12,793,268 B2
(45) Date of Patent: Nov. 10, 2026

(54) SYSTEMS AND METHODS FOR COLOR-BASED OUTFIT CLASSIFICATION

(71) Applicant: Acronis International GmbH, Schaffhausen (CH)

(72) Inventors: Sergey Ulasen, Saint-Petersburg (RU); Alexander Snorkin, Moscow (RU); Andrey Adaschik, Saint-Petersburg (RU); Artem Shapiro, Dnipro (UA); Vasyl Shandyba, Dnipro (UA); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 444 days.

(21) Appl. No.: 17/842,870

(22) Filed: Jun. 17, 2022

(65) Prior Publication Data

US 2022/0405974 A1 Dec. 22, 2022

Related U.S. Application Data

(60) Provisional application No. 63/212,188, filed on Jun. 18, 2021.

(51) Int. Cl.
*G06T 7/90* (2017.01)
*G06F 16/58* (2019.01)
(Continued)

(52) U.S. Cl.
CPC ............ *G06T 7/90* (2017.01); *G06F 16/5866* (2019.01); *G06V 10/764* (2022.01); (Continued)

(58) Field of Classification Search
CPC ............. G06T 7/90; G06T 2207/10016; G06T 2207/20076; G06T 2207/20081; (Continued)

(56) References Cited

U.S. PATENT DOCUMENTS 10,332,089 B1 * 6/2019 Asmi .................. G06Q 20/203
10,402,648 B1 * 9/2019 Shimozaki ........ G06F 18/23213
(Continued)

FOREIGN PATENT DOCUMENTS

CA 3000127 C * 6/2020 ............. G06V 10/82
CA 3163818 A1 * 7/2021 ......... G06F 3/04847
(Continued)

OTHER PUBLICATIONS

Gever et al, Color Based Object Recognition, Pattern Recognition 32 (1999) 453-464, Feb. 4, 1998.*
(Continued)

*Primary Examiner* — Emily C Terrell
*Assistant Examiner* — Jordan Mckenzie Elliott
(74) *Attorney, Agent, or Firm* — ArentFox Schiff LLP; Michael Fainberg

(57) ABSTRACT

Disclosed herein are systems and method for classifying objects in an image using a color-based machine learning classifier. A method may include: training, with a dataset including a plurality of images, a machine learning classifier to classify an object in a given image into a color class from a set of color classes of a first size; receiving an input image depicting at least one object belonging to the set of color classes; determining a subset of color classes that are anticipated to be in the input image based on metadata of the input image; generating a matched mask input indicating the subset set of color classes in the input image, wherein the subset of color classes is of a second size that is smaller than the first size; and inputting both the input image and the matched mask input into the machine learning classifier.

19 Claims, 4 Drawing Sheets

(51) Int. Cl.

| | |
|---|---|
| ***G06V 10/764*** | (2022.01) |
| ***G06V 10/774*** | (2022.01) |
| ***G06V 10/82*** | (2022.01) |
| ***G06V 20/40*** | (2022.01) |

(52) U.S. Cl.

CPC ............ *G06V 10/774* (2022.01); *G06V 10/82* (2022.01); *G06V 20/41* (2022.01); *G06T 2207/10016* (2013.01); *G06T 2207/20076* (2013.01); *G06T 2207/20081* (2013.01); *G06T 2207/20084* (2013.01); *G06T 2207/30196* (2013.01); *G06V 2201/10* (2022.01)

(58) Field of Classification Search

CPC . G06T 2207/20084; G06T 2207/30196; G06T 2207/30221; G06F 16/5866; G06F 16/587; G06V 10/82; G06V 2201/10; G06V 10/764; G06V 10/774; G06V 20/41; G06V 20/52; G06V 40/10

See application file for complete search history.

(56) References Cited

U.S. PATENT DOCUMENTS

| | | | | |
|---|---|---|---|---|
| 11,170,215 | B1 * | 11/2021 | Sieracki | G06F 18/23 |
| 2007/0200929 | A1 * | 8/2007 | Conaway | A63B 71/0605 348/157 |
| 2010/0026801 | A1 * | 2/2010 | Williams | G06F 16/70 348/157 |
| 2012/0106854 | A1 * | 5/2012 | Tang | G06F 18/254 382/224 |
| 2012/0197104 | A1 * | 8/2012 | Posse | G01R 33/4838 600/410 |
| 2015/0297949 | A1 * | 10/2015 | Aman | G06T 7/246 348/157 |
| 2015/0379731 | A1 * | 12/2015 | Dorner | H04N 1/644 382/164 |
| 2017/0076142 | A1 * | 3/2017 | Chang | G06T 7/11 |
| 2018/0012110 | A1 * | 1/2018 | Souche | G06F 16/50 |
| 2018/0315196 | A1 * | 11/2018 | Socek | G06V 10/56 |
| 2018/0373722 | A1 * | 12/2018 | Ulasen | G06N 3/044 |
| 2019/0362546 | A1 * | 11/2019 | Wayenberg | G06T 17/20 |
| 2020/0160030 | A1 * | 5/2020 | Lavi | G06T 7/90 |
| 2020/0193163 | A1 * | 6/2020 | Chang | H04N 21/4662 |
| 2020/0302181 | A1 * | 9/2020 | Bhanu | A63B 24/0006 |
| 2020/0394413 | A1 * | 12/2020 | Bhanu | G06N 3/045 |
| 2021/0027497 | A1 * | 1/2021 | Ding | G06V 20/20 |
| 2021/0097733 | A1 * | 4/2021 | Walker | G06T 11/10 |
| 2021/0275893 | A1 * | 9/2021 | McWilliams | A63B 71/0669 |
| 2021/0303865 | A1 * | 9/2021 | Anol | A63B 71/0605 |
| 2021/0303920 | A1 * | 9/2021 | Das | G06F 18/214 |
| 2021/0319668 | A1 * | 10/2021 | Huke | G06N 20/00 |
| 2022/0004604 | A1 * | 1/2022 | Simmons | G06F 16/535 |
| 2022/0189029 | A1 * | 6/2022 | Mequanint | G06T 7/194 |
| 2022/0383031 | A1 * | 12/2022 | Chen | G06F 16/56 |
| 2022/0406045 | A1 * | 12/2022 | Ulasen | G06V 10/764 |

FOREIGN PATENT DOCUMENTS

| | | | | | |
|---|---|---|---|---|---|
| CA | 3172012 | A1 * | 12/2021 | A01M 1/08 |
| CA | 3138959 | C * | 9/2023 | G16H 30/40 |
| EP | 1886230 | A2 * | 2/2008 | A63F 13/12 |
| EP | 4303820 | A1 * | 1/2024 | G06T 7/0012 |
| KR | 20210055038 | A * | 5/2021 | G06V 40/103 |
| WO | WO-2005099423 | A2 * | 10/2005 | G06V 20/42 |
| WO | WO-2018187622 | A1 * | 10/2018 | G06V 20/00 |

OTHER PUBLICATIONS

Rachmadi et al, Vehicle Color Recognition using Convolutional Neural Network, Aug. 15, 2018.*

* cited by examiner

200

SYSTEMS AND METHODS FOR COLOR-BASED OUTFIT CLASSIFICATION

CROSS-REFERENCE TO RELATED APPLICATIONS

This application claims the benefit of U.S. Provisional Application No. 63/212,188, filed Jun. 18, 2021, which is herein incorporated by reference.

FIELD OF TECHNOLOGY

The present disclosure relates to the field of computer vision, and, more specifically, to systems and methods for color-based outfit classification.

BACKGROUND

Outfit classification is important for various industries such as security, employment, sports, etc. For example, if a security camera is installed in the street, outfit classification can be used for distinguishing between law enforcement and average pedestrians. In another example, if a sports broadcast is tracking players, outfit classification can be used for distinguishing players on opposing teams.

Color-based outfit classification may be used as a quick method in which feature extraction is relatively simple as compared to classification schemes that extract several attributes (e.g., pants, shirt, collar, shoes, etc.). In the case of sports, color-based outfit classification allows to significantly reduce track switches between players which have different outfits. This increases tracking accuracy and reduces post processing work.

Although color-based outfit classification offers speed because of its simplicity, depending on the quality of training dataset, the quality of the input image, and the likeness of colors, the accuracy of the classification can be inconsistent. For example, in a sports broadcast, the players appear small depending on the camera view and certain player uniforms look similar (e.g., a black uniform at a distance may look like a dark blue uniform).

There thus exists a need for fast color-based outfit classification with high accuracy.

SUMMARY

In one exemplary aspect, the techniques described herein relate to a method for classifying objects in an image using a color-based machine learning classifier, the method including: training, with a dataset including a plurality of images, a machine learning classifier to classify an object in a given image into a color class from a set of color classes each representing a distinct color, wherein the color class represents a predominant color of the object and wherein the set of color classes is of a first size; receiving an input image depicting at least one object belonging to the set of color classes; determining, from the set of color classes, a subset of color classes that are anticipated to be in the input image based on metadata of the input image; generating a matched mask input indicating the subset set of color classes in the input image, wherein the subset of color classes is of a second size that is smaller than the first size; inputting both the input image and the matched mask input into the machine learning classifier, wherein the machine learning classifier is configured to classify the at least one object into at least one color class of the subset of color classes; and outputting the at least one color class.

In some aspects, the techniques described herein relate to a method, wherein the metadata of the input image includes a timestamp and an identifier of a source location of the input image, further including: identifying, in a database that maps timestamps to color classes, a list of color classes that are associated with the timestamp of the input image; and including, in the subset of color classes, color classes in the list.

In some aspects, the techniques described herein relate to a method, wherein the database is provided by the source location.

In some aspects, the techniques described herein relate to a method, wherein the matched mask input further identifies similar classes that the at least one object does not belong to.

In some aspects, the techniques described herein relate to a method, wherein the machine learning classifier is a convolutional neural network.

In some aspects, the techniques described herein relate to a method, wherein the machine learning classifier is configured to: determine, for each respective color class in the set of color classes, a respective probability of the at least one object belonging to the respective color class; and adjust the respective probability based on whether the respective color class is present in the matched mask input.

In some aspects, the techniques described herein relate to a method, wherein the input image is a video frame of a livestream, and wherein the machine learning classifier classifies the at least one object in real-time.

In some aspects, the techniques described herein relate to a method, wherein the at least one object is a person wearing an outfit of a particular color.

It should be noted that the methods described above may be implemented in a system comprising a hardware processor. Alternatively, the methods may be implemented using computer executable instructions of a non-transitory computer readable medium.

In some aspects, the techniques described herein relate to a system for classifying objects in an image using a color-based machine learning classifier, the system including: a hardware processor configured to: train, with a dataset including a plurality of images, a machine learning classifier to classify an object in a given image into a color class from a set of color classes each representing a distinct color, wherein the color class represents a predominant color of the object and wherein the set of color classes is of a first size; receive an input image depicting at least one object belonging to the set of color classes; determine, from the set of color classes, a subset of color classes that are anticipated to be in the input image based on metadata of the input image; generate a matched mask input indicating the subset set of color classes in the input image, wherein the subset of color classes is of a second size that is smaller than the first size; input both the input image and the matched mask input into the machine learning classifier, wherein the machine learning classifier is configured to classify the at least one object into at least one color class of the subset of color classes; and output the at least one color class.

In some aspects, the techniques described herein relate to a non-transitory computer readable medium storing thereon computer executable instructions for classifying objects in an image using a color-based machine learning classifier, including instructions for: training, with a dataset including a plurality of images, a machine learning classifier to classify an object in a given image into a color class from a set of color classes each representing a distinct color, wherein the color class represents a predominant color of the object and wherein the set of color classes is of a first size;

receiving an input image depicting at least one object belonging to the set of color classes; determining, from the set of color classes, a subset of color classes that are anticipated to be in the input image based on metadata of the input image; generating a matched mask input indicating the subset set of color classes in the input image, wherein the subset of color classes is of a second size that is smaller than the first size; inputting both the input image and the matched mask input into the machine learning classifier, wherein the machine learning classifier is configured to classify the at least one object into at least one color class of the subset of color classes; and outputting the at least one color class.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for color-based outfit classification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the shortcomings of conventional outfit classifiers, the present disclosure presents how to train a classifier for quick and accurate color class detection. The task of training the outfits classifier has two corner cases. In the first case, there are more than twenty predefined outfit classes. Because there are many outfits and each outfit is distinct, the classifier will predict the wrong class in a test setting at random. In the second case, there are fewer than ten predefined outfit classes. Because the predefined outfit set has few similar outfits the classifier predictions will be fluctuate between them.

To make outfit color classifier both general and precise, the present disclosure describes training a classifier using a large predefined number of outfits and providing an additional color mask as a input. In an exemplary aspect, the training dataset comprises images of people with outfits of different colors. In some aspects, the classifier may be a convolutional neural network with a loss calculation method being cross entropy.

Figure 1:
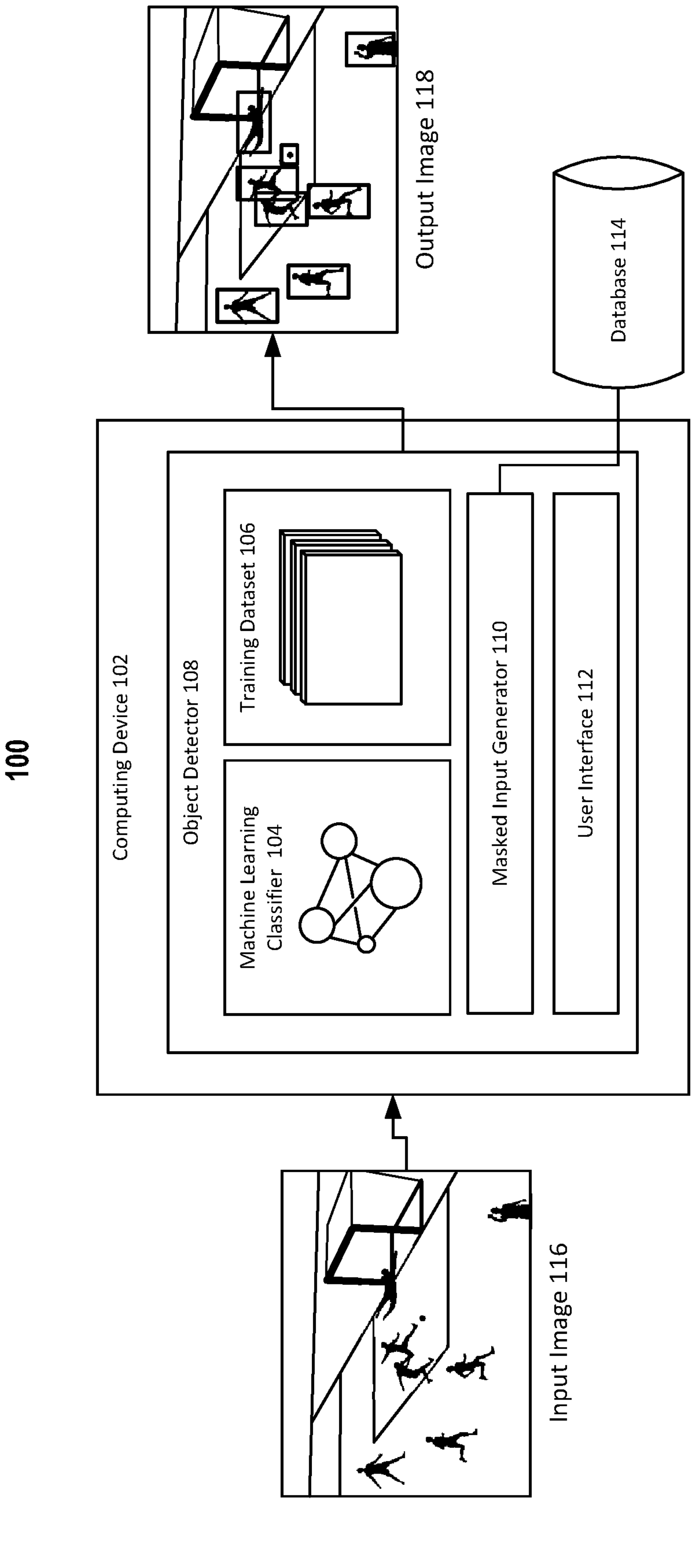
FIG. 1 is a block diagram illustrating a system for color-based outfit classification.

FIG. 1 is a block diagram illustrating system 100 for color-based outfit classification. In an exemplary aspect, system 100 includes a computing device 102 that stores machine learning classifier 104 and training dataset 106 in memory. Machine learning classifier 104 may be an image classifier that identifies an object in an image and outputs a label. Machine learning classifier 104 may also be an image classifier that identifies an object in an image and generates a boundary around the object. In some aspects, machine learning classifier 104 may be used to track an object belonging to a particular color class across multiple image frames (e.g., in a video).

Object detector 108 is a software module that comprises machine learning classifier 104, training dataset 106, masked input generator 110, and user interface 112. User interface 112 accepts an input image 116 and provides output image 118. In some aspects, machine learning classifier 104 and training dataset 106 may be stored on a different device than computing device 102. Computing device 102 may be a computer system (described in FIG. 4) such as a smartphone. If machine learning classifier 104 and/or training dataset 106 are stored on a different device (e.g., a server), computing device 102 may communicate with the different device to acquire information about the structure of machine learning classifier 104, code of machine learning classifier 104, images in training dataset 106, etc. This communication may take place over a network (e.g., the Internet). For example, object detector 108 may be split into a thin client application and a thick client application. A user may provide input image 116 via user interface 112 on computing device 102. Interface 112, in this case, is part of the thin client. Subsequently, input image 116 may be sent to the different device comprising the thick client with machine learning classifier 104 and training dataset 106. Machine learning classifier 104 may yield output image 118 and transmit it to computing device 102 for output via user interface 112. In some aspects, machine learning classifier 104 is a convolutional neural network.

Consider an example in which input image 116 is a frame of a real-time video stream depicting multiple objects. This video stream may be of a soccer match and the multiple objects may include a soccer ball and humans (e.g., players, coaches, staff, fans, etc.). As shown in FIG. 1, the image may be a far-view of the soccer field (e.g., a broadcast view). Training dataset 106 may include a plurality of images each depicting one or more objects (in this case, the objects are players and staff).

Figure 2:
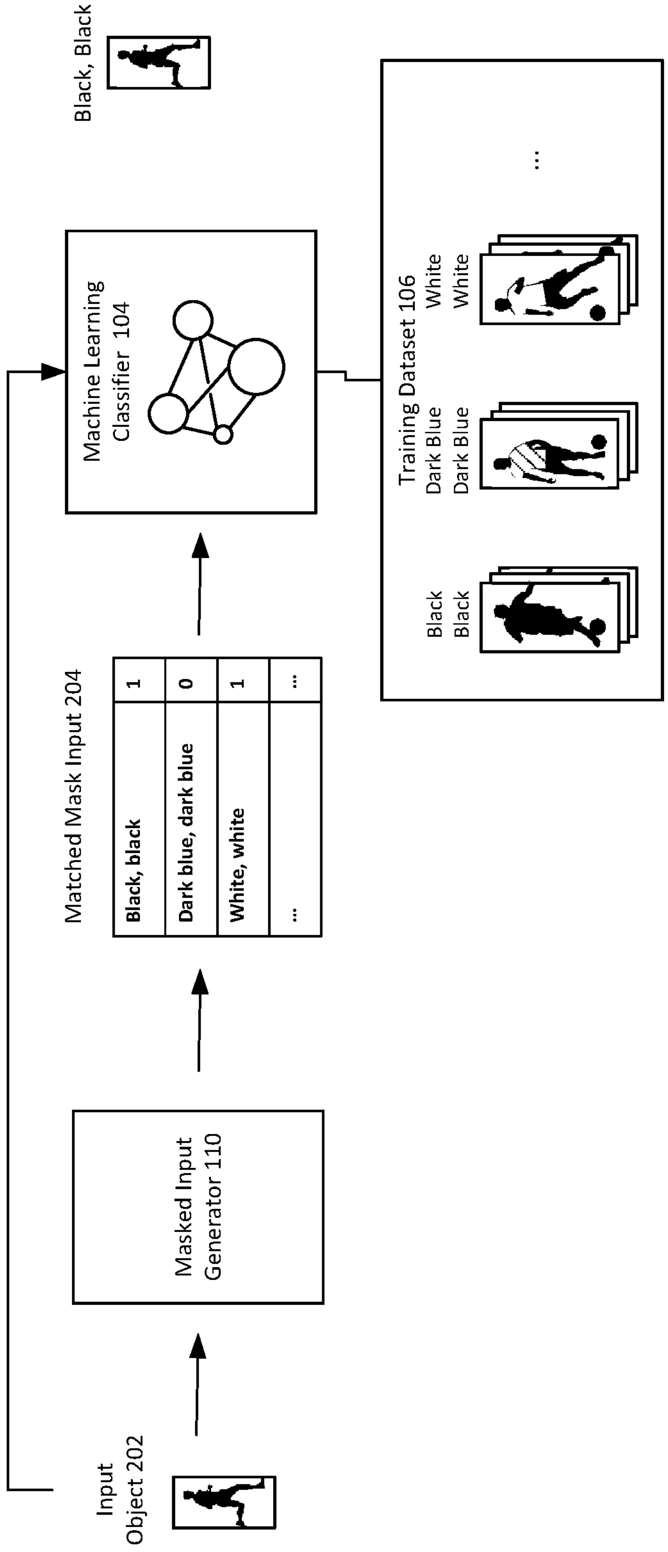
FIG. 2 is a diagram illustrating an example of an image being classified using the system for color-based outfit classification.

FIG. 2 is a diagram illustrating an example 200 of an image being classified using the system for color-based outfit classification. The image may comprise input object 202.

In an exemplary aspect, machine learning classifier 104 is trained using training dataset 106 to classify an object in a given image into a color class from a set of color classes each representing a distinct color. For example, an object may be a person wearing an outfit of a particular color. The color class thus represents a predominant color of the object. For example, input object 202 is an athlete wearing a black jersey. The set of color classes may include different colors of jerseys that athletes wear. Suppose that a league has thirty teams, each with two outfits. This indicates that there are sixty jerseys with unique color schemes and thus the set of color classes has a size of 60 classes. Some of these jerseys may appear similar, such as two teams that both have red jerseys. In some cases, the red jerseys may each have different shades, but may be close enough for a misclassification by a machine learning algorithm. This is because in different lighting and in different cameras, a single color will look different in an image.

In response to receiving an input image depicting at least one object belonging to the set of color classes, object detector 108 determines, from the set of color classes, a subset of color classes that are anticipated to be in the input image based on metadata of the input image, and generates a matched mask input indicating the subset set of color classes in the input image.

In some aspects, the matched mask input is an input vector that indicates which color classes from the set of color classes can possibly be present in an image. For example, in a soccer match, there are two teams that play in a single game. Training dataset 106 may include very similar colors, for example, for a black color, there is a similar dark blue color. A 60-class classifier will have problems distinguishing between black and dark blue and may misclassify. However, a typical soccer game has just 5 colors (e.g., team1 player, team1 goalkeeper, team2 player, team2 goalkeeper, referee) and these colors are contrasting. A 5-class classifier will be more effective in identifying colors. The match masked input serves as a hint of which colors are present in an image. In this example, matched mask input 204 may be a 60-dimensional binary vector with 5 ones and 55 zeros). For example, the matched mask input may indicate that a team with black colors and a team with white colors is playing. Machine learning classifier 104 can then narrow its approach by applying a large penalty when predicting color classes that are not in the mask during training. One approach to this is to apply the matched masked binary vector to, for example, a softmax layer output, which results in probabilities for the non-present colors to go to zero. This prevents the classifier from selecting the non-present colors as the final color class. Without the matched mask input, machine learning classifier 104 may misclassify a black jersey with dark blue, grey, etc., all in one image.

In order to determine which colors to include in the subset of color classes, mask input generator 110 may utilize the metadata associated with the input image. For example, the metadata may include a timestamp of the input image and an identifier of the source location where the input image came from. In the case of a soccer match, the timestamp may originate from a live video stream. For example, the input image may be a video frame of a livestream, and wherein the machine learning classifier classifies the at least one object in real-time. The broadcast source may provide access to database 114, that maps timestamps to color classes. For example, database 114 may indicate when certain teams are playing soccer at a given time. In response to determining that the timestamp of the input image corresponds to a soccer match between two particular teams, mask input generator 110 may identify a list of color classes that are associated with the timestamp of the input image and including, in the subset of color classes, color classes in the list.

Object detector 108 then inputs both the input image and the matched mask input into the machine learning classifier. For example, both object 202 and input 204 may be input into machine learning classifier 104. Classifier 104 is configured to classify the at least one object into at least one color class of the subset of color classes. More specifically, classifier 104 determines, for each respective color class in the set of color classes, a respective probability of the at least one object belonging to the respective color class. Classifier 104 then adjusts the respective probability based on whether the respective color class is present in the matched mask input (e.g., if set to "0" in the matched mask input, set the probability to 0). Object detector 108 then outputs the at least one color class.

In some aspects, the matched mask input identifies similar classes that the at least one object in an input image does not belong to. For example, object detector 108 may group colors of the same shade and/or similar colors. A first group may include colors such as dark purple, indigo, navy, etc. A second group may include colors such as yellow, light orange, beige, gold, etc. Because a colored outfit may appear different depending on lighting (e.g., a navy color jersey may appear as blue in direct sunlight and as black in a shaded area), a classifier may be unable to determine an exact matching color. This is especially difficult in the image frames where multiple lighting sources are present.

For example, a portion of a soccer field may be covered in sunlight and remainder may be shaded. For a conventional 60-class classifier, a player wearing a navy jersey may run from a sunlit portion to a shaded portion, and the classifier may incorrectly identify the person as wearing two or more colors based on player position. More specifically, suppose that in a first image frame captured at time t1, a player wearing a navy jersey is identified and the color classifier classifies the color of the jersey as blue. Suppose that in the first image frame, the player is standing in a portion of the environment that is sunlit. Accordingly, colors appear brighter than they actually are. In a second image frame captured at time t2, the player is identified again and the color jersey is classified as black. In this image frame, the player may be standing in a portion of the environment that is shaded. Accordingly, colors appear darker than they actually are. Suppose that in a third image frame captured at time t3, the player is identified again the color jersey is classified as navy. In this case, it may be past sundown and stadium lights may be illuminating the field. However, two of the three classifications above are incorrect. If the objective of the classifier is to distinguish between players or track them as they move along the field, the classifier's three distinct class outputs may prevent the objective from being met. The classifier may instead believe that there are three different players on the field at different times.

To eliminate this, the mask input may be utilized along with information about similar classes. Consider the following grouping of similar classes:

| Group 1 | Group 2 | Group 3 | . . . | Group N |
|---|---|---|---|---|
| Yellow | Navy | White | . . . | Color 1 |
| Beige | Indigo | Light Gray | . . . | Color 2 |
| Gold | Black | Silver | . . . | . . . |
| Light Orange | Blue | Light Blue | . . . | Color N |

The groupings may be stored as a data structure in memory accessible to object detector 108. A 60-class classifier that can classifier any of the colors above and more may identify at t1, the color worn by the player as blue. This color falls under group 2. At t2, the color is classified as black, which also falls under group 2. At t3, the color is classified as navy, which falls under group 2 as well. Suppose that the mask input indicates that the image frame includes a navy color (e.g., the metadata states that a team with a navy jersey is playing). Object detector 108 determines that navy is in group 2. In response to determining the group of the color in the mask input, object detector 108 reclassifies all outputs of the color classifier (e.g., classifier 104) into a "true" color based on a matching group. Therefore, for the frame captured at time t1, the output "blue" is switched to "navy" because both navy (the actual color) and blue share the same group. Likewise, for the frame captured at time t2, the output "black" is switched to navy because both navy and black share the same group.

This allows for color classes that are definitely not in the input image to be removed, preventing misclassification. This unifies classifications within one frame. In other words, if two teams are playing, the outputs are solely the colors associated with the teams rather than different shades caused by lighting/weather. For example, two members on the same team will be classified as such even if their jerseys appear different when one player stands in a sunlit portion and another stands in a shaded portion of a field. The reclassification also unifies classifications for multiple image frames that share a mask input. For example, a player that runs from one portion with a first light setting into a different portion with a second light setting over two image frames will be identified by the same color class.

In another example, the video stream may be security camera footage. A user may be interested in tracking the path of a security guard in an office. Suppose that employees of the office each have their own uniform. For example, security officers may wear black, janitors may wear dark blue, secretaries may wear light blue, etc. Accordingly, machine learning classifier 104 may be trained to receive an input image of an employee and classify the color class. In a conventional classifier, security officers and janitors may be misclassified due to the similarity of their uniform colors. However, mask input generator 110 may refer to a database that indicates when certain employees are present at the office. Suppose that the input image is taken at 9:00 am. At this case, it is possible that janitors are not present and security officers are present at the office. Generator 110 may thus generate an input vector that indicates a "0" for dark blue and a "1" for black.

Figure 3:
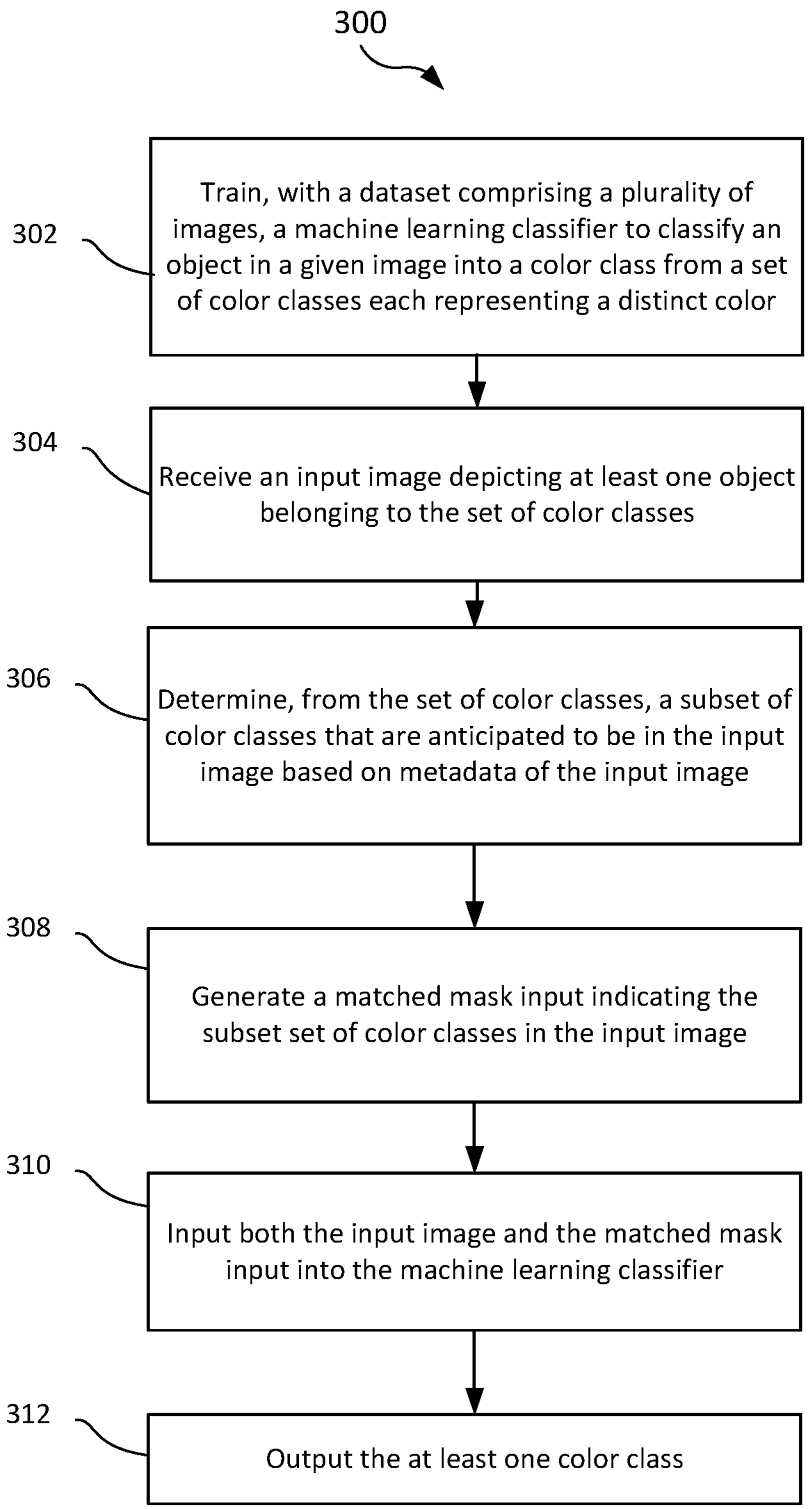
FIG. 3 illustrates a flow diagram of a method for color-based outfit classification.

FIG. 3 illustrates a flow diagram of a method for color-based outfit classification. At 302, object detector 108 trains, with a dataset comprising a plurality of images (e.g., dataset 106), a machine learning classifier (e.g., classifier 104) to classify an object in a given image into a color class from a set of color classes each representing a distinct color.

At 304, object detector 108 receives an input image (e.g., image 116) depicting at least one object belonging to the set of color classes (e.g., a player wearing a color-coded outfit). At 306, masked input generator 110 determines, from the set of color classes, a subset of color classes that are anticipated to be in the input image based on metadata of the input image. At 308, masked input generator 110 generates a matched mask input indicating the subset set of color classes in the input image.

At 310, object detector 108 inputs both the input image and the matched mask input into the machine learning classifier, wherein the machine learning classifier is configured to classify the at least one object into at least one color class of the subset of color classes. At 312, object detector 108 outputs the at least one color class via user interface 112.

Figure 4:
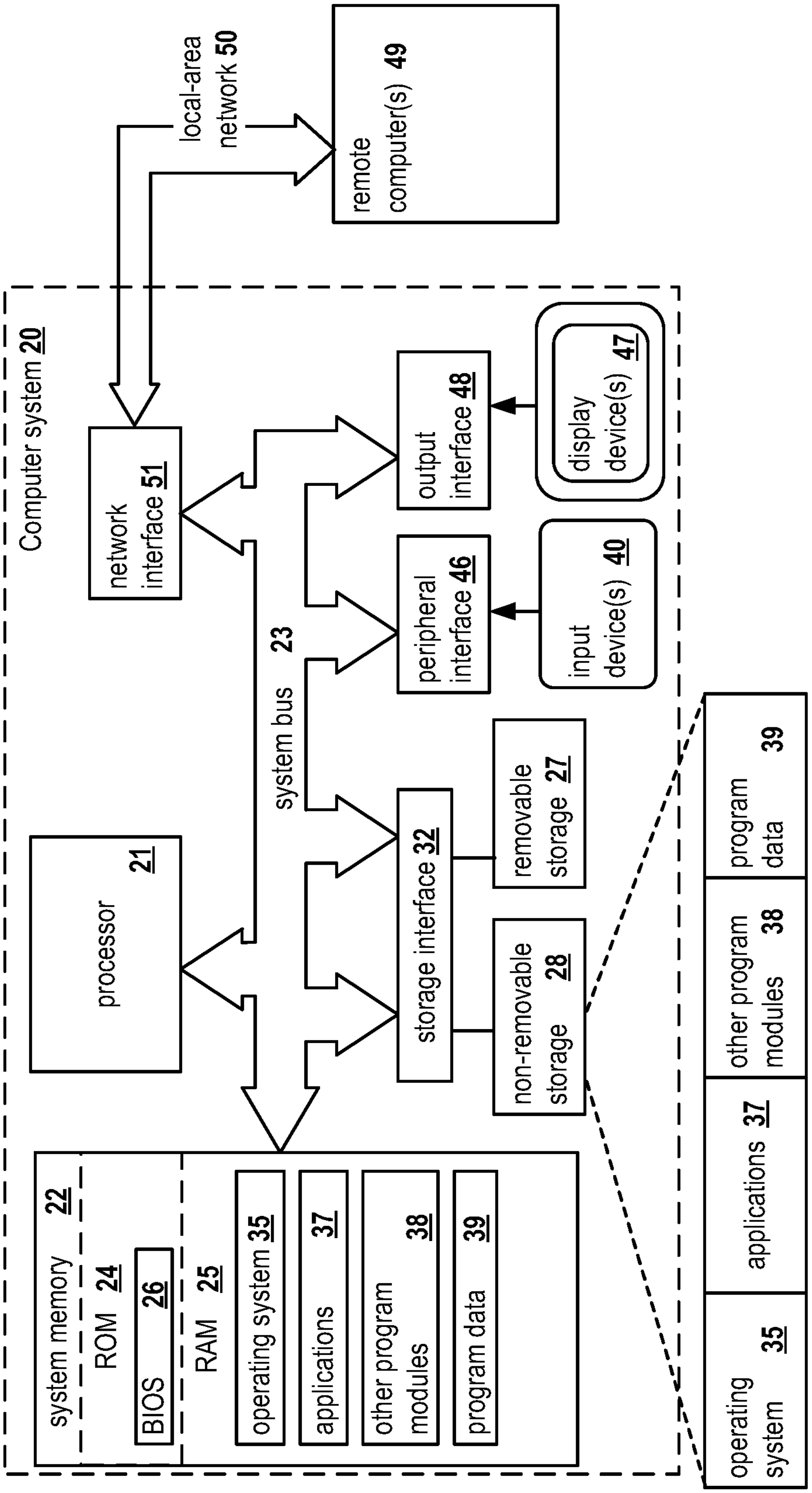
FIG. 4 presents an example of a general-purpose computer system on which aspects of the present disclosure can be implemented.

FIG. 4 is a block diagram illustrating a computer system 20 on which aspects of systems and methods for color-based outfit classification may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for classifying objects in an image using a color-based machine learning classifier, the method comprising:
   - training, with a dataset comprising a plurality of images, a machine learning classifier to classify an object in a given image into a color class from a set of color classes each representing a distinct color, wherein the color class represents a predominant color of the object and wherein the set of color classes is of a first size;
   - receiving an input image depicting at least one object belonging to the set of color classes;
   - determining, from the set of color classes, a subset of color classes that are anticipated to be in the input image based on metadata of the input image;
   - generating a matched mask input indicating the subset of color classes in the input image, wherein the subset of color classes is of a second size that is smaller than the first size, and wherein generating the matched mask input comprises generating a multi-dimensional binary vector where a first binary value is assigned to color classes present in the subset and a second binary value is assigned to color classes absent from the subset;
   - inputting both the input image and the matched mask input into the machine learning classifier, wherein the machine learning classifier is configured to classify the at least one object into at least one color class of the subset of color classes, and wherein the machine learning classifier comprises a softmax layer;
   - applying the multi-dimensional binary vector to an output of the softmax layer to force probabilities of the color classes assigned the second binary value to zero, thereby preventing the machine learning classifier from selecting the color classes absent from the subset; and
   - outputting the at least one color class.

2. The method of claim 1, wherein the matched mask input further identifies similar classes that the at least one object does not belong to.

3. The method of claim 1, wherein the machine learning classifier is a convolutional neural network.

4. The method of claim 1, wherein the machine learning classifier is configured to:
   - determine, for each respective color class in the set of color classes, a respective probability of the at least one object belonging to the respective color class; and
   - adjust the respective probability based on whether the respective color class is present in the matched mask input.

5. The method of claim 1, wherein the input image is a video frame of a livestream, and wherein the machine learning classifier classifies the at least one object in real-time.

6. The method of claim 1, wherein the at least one object is a person wearing an outfit of a particular color.

7. A system for classifying objects in an image using a color-based machine learning classifier, the system comprising:
   - a hardware processor configured to:
     - train, with a dataset comprising a plurality of images, a machine learning classifier to classify an object in a given image into a color class from a set of color classes each representing a distinct color, wherein the color class represents a predominant color of the object and wherein the set of color classes is of a first size;
     - receive an input image depicting at least one object belonging to the set of color classes;
     - determine, from the set of color classes, a subset of color classes that are anticipated to be in the input image based on metadata of the input image;
     - generate a matched mask input indicating the subset of color classes in the input image, wherein the subset of color classes is of a second size that is smaller than the first size, and wherein generating the matched mask input comprises generating a multi-dimensional binary vector where a first binary value is assigned to color classes present in the subset and a second binary value is assigned to color classes absent from the subset;
     - input both the input image and the matched mask input into the machine learning classifier, wherein the machine learning classifier is configured to classify the at least one object into at least one color class of the subset of color classes, and wherein the machine learning classifier comprises a softmax layer;
     - apply the multi-dimensional binary vector to an output of the softmax layer to force probabilities of the color classes assigned the second binary value to zero, thereby preventing the machine learning classifier from selecting the color classes absent from the subset; and
     - output the at least one color class.

8. The system of claim 7, wherein the matched mask input further identifies similar classes that the at least one object does not belong to.

9. The system of claim 7, wherein the machine learning classifier is a convolutional neural network.

10. The system of claim 7, wherein the machine learning classifier is configured to:
   - determine, for each respective color class in the set of color classes, a respective probability of the at least one object belonging to the respective color class; and
   - adjust the respective probability based on whether the respective color class is present in the matched mask input.

11. The system of claim 7, wherein the input image is a video frame of a livestream, and wherein the machine learning classifier classifies the at least one object in real-time.

12. The system of claim 7, wherein the at least one object is a person wearing an outfit of a particular color.

13. A non-transitory computer readable medium storing thereon computer executable instructions for classifying objects in an image using a color-based machine learning classifier, including instructions for:
   - training, with a dataset comprising a plurality of images, a machine learning classifier to classify an object in a given image into a color class from a set of color classes each representing a distinct color, wherein the color class represents a predominant color of the object and wherein the set of color classes is of a first size;
   - receiving an input image depicting at least one object belonging to the set of color classes;
   - determining, from the set of color classes, a subset of color classes that are anticipated to be in the input image based on metadata of the input image;
   - generating a matched mask input indicating the subset of color classes in the input image, wherein the subset of color classes is of a second size that is smaller than the first size, and wherein generating the matched mask input comprises generating a multi-dimensional binary vector where a first binary value is assigned to color classes present in the subset and a second binary value is assigned to color classes absent from the subset;

inputting both the input image and the matched mask input into the machine learning classifier, wherein the machine learning classifier is configured to classify the at least one object into at least one color class of the subset of color classes, and wherein the machine learning classifier comprises a softmax layer;

applying the multi-dimensional binary vector to an output of the softmax layer to force probabilities of the color classes assigned the second binary value to zero, thereby preventing the machine learning classifier from selecting the color classes absent from the subset; and outputting the at least one color class.

14. The method of claim 1, wherein the object that the machine learning classifier is trained to classify in the given image into the color class is an athlete wearing a jersey of a particular color, and wherein the database comprises team schedule data that maps timestamps to team color classes and indicates the timestamps of when particular teams are scheduled to play.

15. The system of claim 7, wherein the object that the machine learning classifier is trained to classify in the given image into the color class is an athlete wearing a jersey of a particular color, and wherein the database comprises team schedule data that maps timestamps to team color classes and indicates the timestamps of when particular teams are scheduled to play.

16. The non-transitory computer readable medium of claim 13, wherein the object that the machine learning classifier is trained to classify in the given image into the color class is an athlete wearing a jersey of a particular color, and wherein the database comprises team schedule data that maps timestamps to team color classes and indicates the timestamps of when particular teams are scheduled to play.

17. The method of claim 1, wherein the metadata of the input image comprises a timestamp and an identifier of a source location of the input image, and wherein determining the subset of color classes comprises: identifying, by querying a database provided by the source location using the timestamp and the identifier, a subset of objects associated with the timestamp, wherein the database maps timestamps to color classes to indicate timestamps of when a set of objects will appear in an environment captured by at least the plurality of images; and including, in the subset of color classes, color classes associated with the subset of objects.

18. The system of claim 7, wherein the metadata of the input image comprises a timestamp and an identifier of a source location of the input image, and wherein the hardware processor is further configured to determine the subset of color classes by: identifying, by querying a database provided by the source location using the timestamp and the identifier, a subset of objects associated with the timestamp, wherein the database maps timestamps to color classes to indicate timestamps of when a set of objects will appear in an environment captured by at least the plurality of images; and including, in the subset of color classes, color classes associated with the subset of objects.

19. The non-transitory computer readable medium of claim 13, wherein the metadata of the input image comprises a timestamp and an identifier of a source location of the input image, and wherein determining the subset of color classes comprises: identifying, by querying a database provided by the source location using the timestamp and the identifier, a subset of objects associated with the timestamp, wherein the database maps timestamps to color classes to indicate timestamps of when a set of objects will appear in an environment captured by at least the plurality of images; and including, in the subset of color classes, color classes associated with the subset of objects.

* * * * *